United States Patent [19]

Takao et al.

[11] Patent Number: 4,545,355
[45] Date of Patent: Oct. 8, 1985

[54] CLOSED-LOOP MIXTURE CONTROLLED FUEL INJECTION SYSTEM

[75] Inventors: Mitsunori Takao, Kariya; Takahiko Kimura, Nagoya, both of Japan

[73] Assignee: Nippondenso Co., Ltd., Kariya, Japan

[21] Appl. No.: 574,458

[22] Filed: Jan. 27, 1984

[30] Foreign Application Priority Data

Jan. 28, 1983 [JP] Japan ................... 58-13518

[51] Int. Cl.⁴ .......................................... F02M 51/00
[52] U.S. Cl. ..................... 123/489; 123/440
[58] Field of Search ........................... 123/440, 489

[56] References Cited

U.S. PATENT DOCUMENTS

| | | | |
|---|---|---|---|
| 4,130,095 | 12/1978 | Bowler et al. | 123/440 |
| 4,235,204 | 11/1980 | Rice | 123/489 X |
| 4,319,451 | 3/1982 | Tajima et al. | 123/440 X |
| 4,321,903 | 3/1982 | Kondo et al. | 123/440 |
| 4,345,561 | 8/1982 | Kondo et al. | 123/440 |
| 4,348,727 | 9/1982 | Kobayashi et al. | 123/440 X |
| 4,348,728 | 9/1982 | Sagisaka et al. | 123/440 X |
| 4,365,299 | 12/1982 | Kondo et al. | 123/440 X |
| 4,440,131 | 4/1984 | Felger et al. | 123/440 |
| 4,442,815 | 4/1984 | Ninomiya | 123/480 X |

Primary Examiner—Tony M. Argenbright
Attorney, Agent, or Firm—Cushman, Darby & Cushman

[57] ABSTRACT

A closed-loop mixture control system for an internal combustion engine comprises an intake air pressure sensor, an engine speed sensor, an exhaust gas sensor for detecting the concentration of a predetermined composition of exhaust emissions from said engine, said concentration varying as a function of the air-fuel ratio of a mixture supplied to the engine, a memory having a plurality of storage locations, and a data processor. The processor derives a basic quantity of fuel to be injected to the engine as a function of the detected pressure and engine speed, a mixture trimming value as a function of the detected concentration, a fuel injection trimming value dependent on the mixture trimming value, and stores the fuel injection trimming value into a memory location exclusively addressable as a function of the detected engine speed. The stored fuel injection trimming value is read as a function of the detected engine speed from the memory and summed with the basic quantity in response to which the fuel quantity to be injected to the engine is controlled.

8 Claims, 9 Drawing Figures

CLOSED-LOOP MIXTURE CONTROLLED FUEL INJECTION SYSTEM

BACKGROUND OF THE INVENTION

The present invention relates generally to a closed loop air-fuel mixture control system for an internal combustion engine based on the exhaust emission of the engine, and in particular to such a mixture control system employed in combination with an electronic fuel injection system of the speed density type wherein base fuel injection is derived from data representing intake manifold vacuum and engine speed.

Conventional speed density fuel injection systems employ two sensors, one for sensing the absolute pressure of the engine's intake manifold and the other for detecting the rotational speed of the engine's output shift to derive a control variable as a basic quantity of fuel to be injected to the engine.

In a combined speed-density fuel injection and closed-loop air-fuel mixture system, the detected vacuum is used as an input variable to determine the optimum value of air-fuel ratio. For the closed-loop air-fuel mixture control to operate efficiently, the detected vacuum parameter must be correlated with the quantity of air inducted to the engine as precisely as possible. Such correlation is made on the basis of a fluid model from which the following Equation is derived:

$$Q = A.m.\alpha.\epsilon \sqrt{2g(P_1 - P_2)/\gamma}$$

where, Q is the quantity of the inducted air, A represents the cross-sectional area of an airflow conduit, m is the ratio of the cross-sectional area of the conduit to that of a restriction or orifice, $P_1$ and $P_2$ are the pressures on the upstream and downstream sides of the orifice respectively, $\alpha$ represents the flow coefficient of the fluid which is determined by the nature of the fluid, the configuration of the orifice and the pressures $P_1$ and $P_2$, $\epsilon$ is the coefficient of the fluid's compressibility, g is the acceleration of fluid, and $\gamma$ is the specific gravity of the fluid. Since the above Equation shows that the quantity Q is not exclusively determinable as a function of the pressure $P_1$ which represents the detected manifold vacuum, difficulties have been encountered to derive the quantity of the air actually supplied to the engine from the detected manifold vacuum and hence the optimum value for the basic quantity of fuel injected.

The usual practice is to use the oxygen content of the exhaust gases as detected by an oxygen sensor to correct the basic fuel injection quantity so that the air-fuel ratio of the mixture is maintained at the stoichiometric point.

However, the closed loop operation is disabled when the oxygen sensor remains inactive during engine cold start or when the environment is going to change rapidly such as during engine acceleration. During such disablements, however, the fuel injection control is deprived of the information with which its basic fuel quantity is controlled.

To meet this problem, the applicants' firm has proposed a learning closed-loop mixture control system in which a nonvolatile memory is used for storing engine status trimming values in a matrix of cell locations which are addressable as a function of different engine operating conditions. The stored trimming values are constantly updated according to varying engine operating conditions and retrieved as a function of intake air pressure and engine speed to correct the quantity fuel to be injected so that the air-fuel ratio is optimized for the varying engine conditions. During closed loop disablement periods, the stored data are retrieved to correct the fuel quantity.

However, the proposed system requires a large memory capacity and a complicated algorithm for controlling the memory.

SUMMARY OF THE INVENTION

The present invention is based on the discovery that the amount of air inducted to the engine can be approximated exclusively by the pressure of the inducted air and that the pressure variation of the inducted air can be simply compensated for by adding a trimming value to a basic fuel injection quantity. The invention contemplates the use of a memory in which fuel injection trimming values are stored in different locations addressable exclusively as a function of engine speed.

An object of the invention is to provide a closed-loop mixture control system which requires a small amount of memory capacity for storing the constantly updated trimming values and simplifies the algorithm for controlling the memory.

The closed-loop mixture control system of the invention comprises an intake air pressure sensor, an engine speed sensor, an exhaust gas sensor for detecting the concentration of a predetermined composition of exhaust emissions from said engine, said concentration varying as a function of the air-fuel ratio of a mixture supplied to the engine, a memory having a plurality of storage locations, and a data processor for deriving a basic quantity of fuel to be injected to the engine as a function of the detected pressure and engine speed, deriving a mixture trimming value as a function of the detected concentration, deriving a fuel injection trimming value dependent on the mixture trimming value, storing the fuel injection trimming value into a storage location of the memory exclusively addressable as a function of the detected engine speed, reading the sstored fuel injection trimming value as a function of the detected engine speed from the memory, and trimming the basic quantity by adding thereto the fuel injection trimming value read out of the memory. The fuel quantiy to be injected to the engine is controlled in response to the trimmed basic quantity.

BRIEF DESCRIPTION OF THE DRAWINGS

The present invention will be described in further detail with reference to the accompanying drawings, in which.

DETAILED DESCRIPTION

Figure 1:
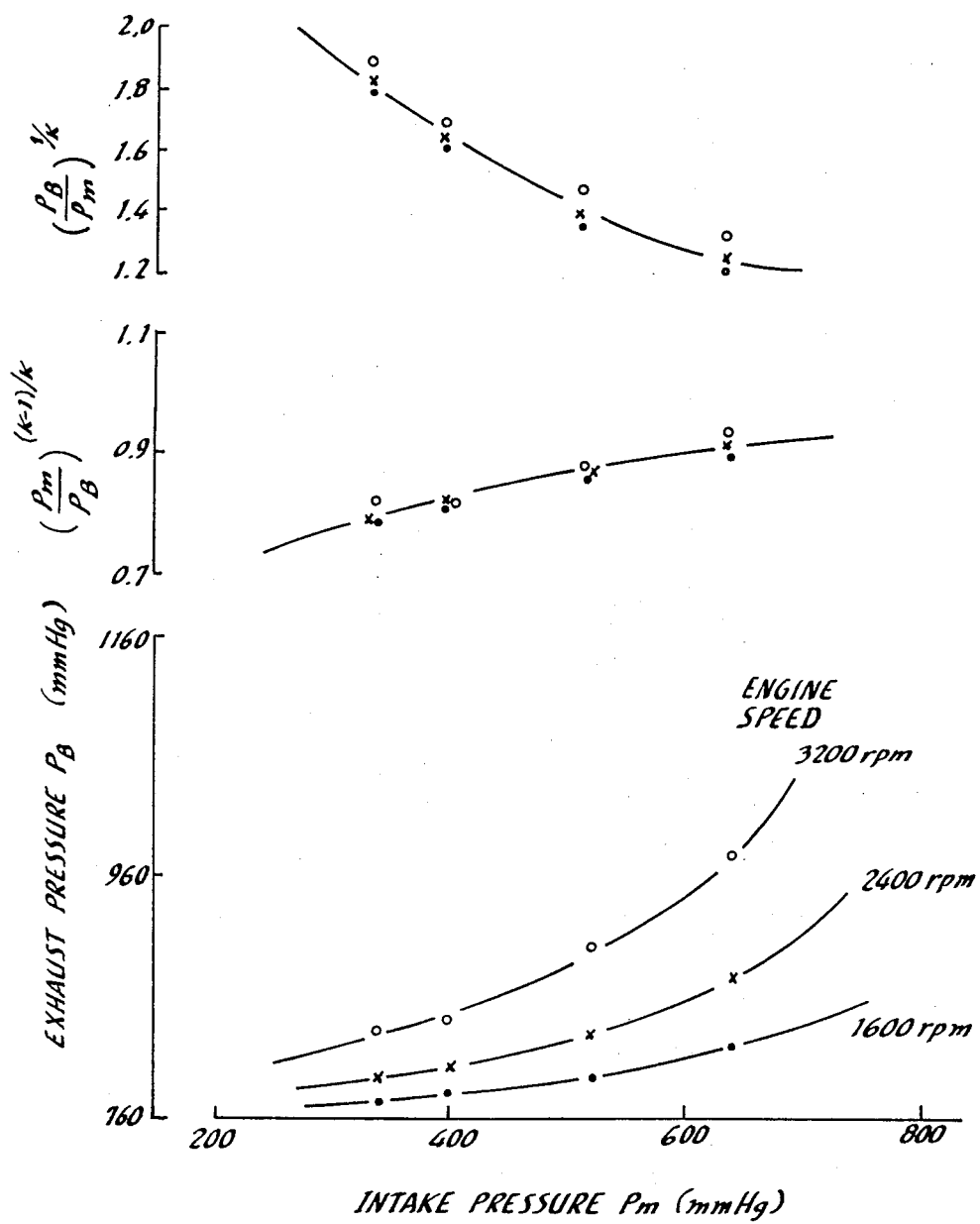
FIGS. 1-3 are graphic illustrations useful for describing the principle underlying the present invention.

Before describing an embodiment of the present invention, reference is first made to FIG. 1 to consider the effect of atmospheric pressure on the air-fuel ratio of mixture fed to an internal combustion engine. A reduction of atmospheric pressure causes a reduction in the exhaust pipe of the engine which in turn causes the pressure of residual gases in the engine cylinders and hence their quantities to reduce, increasing the charging efficiency of the engine. Consequently, the air inducted under a given intake manifold pressure tends to increase by an amount corresponding to the increase in the charging efficiency and the air-fuel mixture is leaned.

Assume that the residual gases have the same volume as that of the cylinder at top dead center and have the same pressure as the pressure inside the exhaust passage, that the cylinder's inside pressure at bottom dead center is equal to the pressure inside the intake passage, and that the cylinder is insulated from the outside so that changes in gas flow therein are considered adiabatic. With the above assumptions, the weight of inducted air Ga which is given as a function of exhaust passage pressure $P_B$ and the variation $\Delta Ga$ in response to a variation $\Delta P_B$ are given by:

$$Ga = C_1 Pm\{1 - 1/\epsilon (P_B/Pm)^{1/k}\}$$

$$\Delta Ga = -C_2 (Pm/P_B)^{(k-1)/k} \cdot \Delta P_B$$

where, $C_1$ and $C_2$ are constants, Pm represents the pressure in the intake air passage, k represents the specific heat ratio and $\epsilon$ represents the compression ratio.

FIG. 1 is a graphic representation of the values $(P_B/Pm)^{1/k}$ and $(Pm/P_B)^{(k-1)/k}$ plotted as a function of intake air pressure Pm. It is seen from FIG. 1 that while $P_B$ is dependent on engine speed the values $(P_B/Pm)^{1/k}$ and $(Pm/P_B)^{(k-1)/k}$ are not, and can be approximated by an independent variable which is exclusively a function of Pm.

Figure 2:
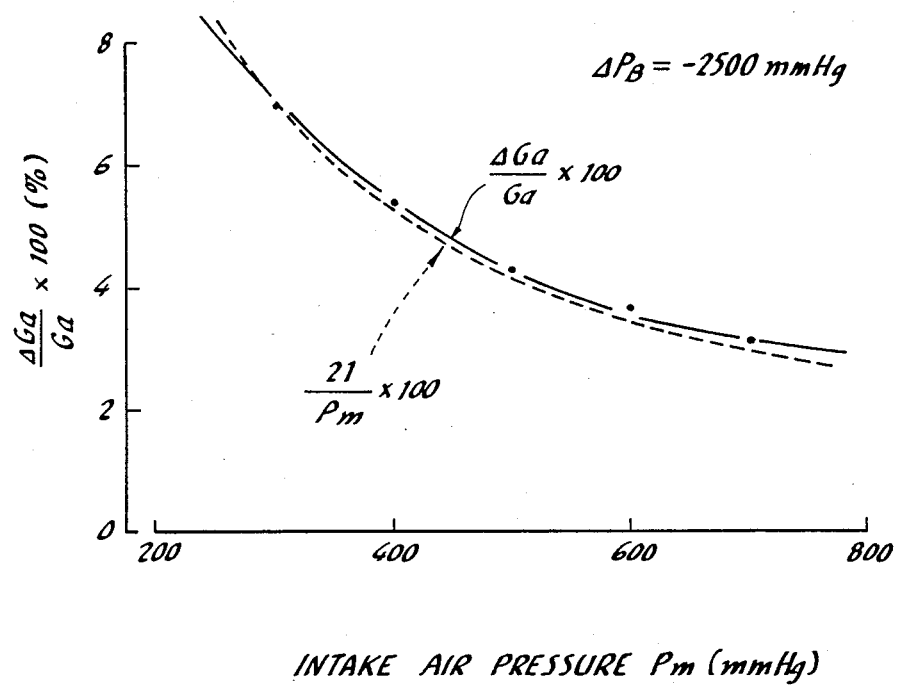

FIG. 2 shows a plot of percentage $\Delta Ga/Ga$ as a function of Pm. The plot follows a solid-line curve which is a section of a hyperbola which is substantially in agreement with a hyperbola $(21/Pm) \times 100$ indicated by a broken-line curve. Thus the maximum range of variations in mixture ratio resulting from exhaust pressure variations corresponds to a fuel injection quantity which would result from an intake pressure variation of 21 mmHg. It is therefore seen that the basic fuel injection quantity is appropriately corrected by a trimming value representing the fuel injection quantity just described. In other words, a single trimming value can be used for all engine operating conditions in a closed loop mixture ratio control system which compensates for atmospheric pressure variations. Adding the trimming value to the basic fuel injection quantity can compensate for varying engine conditions.

Figure 3:
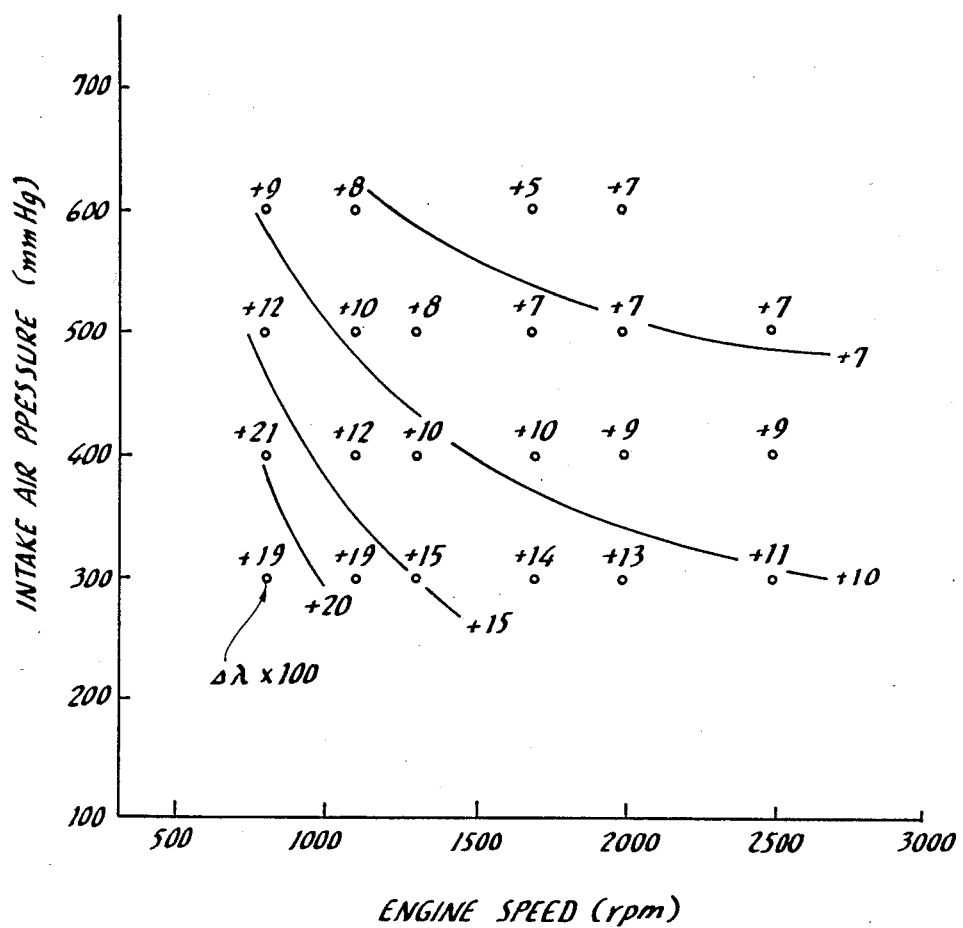
Figure 4:
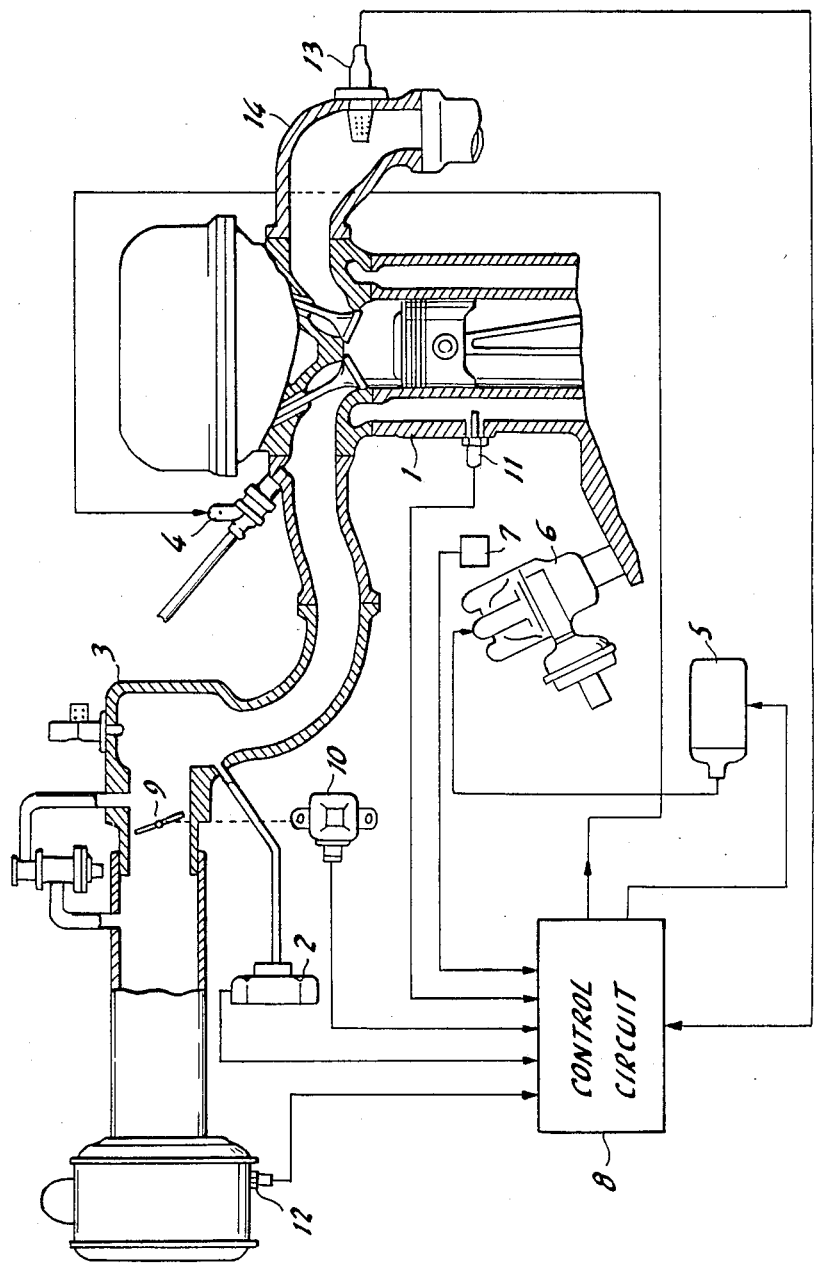
FIG. 4 is a diagrammatic view of the closed-loop mixture control system of the invention.

Consider now the effect of variations of intake and exhaust valve clearances as a function of time on the air-fuel mixture ratio. Excess air ratios $\Delta \lambda$ were derived experimentally by varying the intake and exhaust valve clearances. FIG. 3 illustrates a plot of the excess air ratio as a function of engine speed and intake air pressure.

It is seen from FIG. 3 that a single trimming value can also be used for correcting the basic fuel injection quantity against intake air pressure variations in a manner similar to the atmospheric pressure compensation described above. On the other hand, different trimming values are necessary for compensating for engine speed variations.

From the foregoing discussion it follows that the atmospheric pressure variations and ageing of intake and exhaust valve clearances can be compensated for by adding an associated trimming value to the basic fuel injection quantity and engine speed variations are compensated for by selecting the right trimming value from a plurality of trimming values and adding it to the basic fuel injection quantity.

A preferred embodiment of the present invention will now be described with reference to FIGS. 4 to 8. A six-cylinder internal combustion engine is shown partly broken away to reveal the inside of one of its cylinders 1, intake manifold 3 and exhaust manifold 14. A pressure sensor 2 coupled to the intake manifold 3 to detect the pressure of air inducted to the engine cylinder 1. An electromagnetic fuel injection valve 4 is located adjacent the intake port of each cylinder. Illustrated at 5 is an ignition coil forming part of an ignitor which provides high tension ignition pulses to a distributor 6 whose rotor shaft is coupled to the output shaft of the engine so that it turns at one-half the engine speed. A control circuit 8 is provided to operate on signals received from various sensors. These sensors include a rotary detector unit 7 provided in the distributor 7, a throttle position sensor 10 coupled to a throttle valve 9 located in the main air intake passage, a temperature sensor 11 mounted on the engine block to detect the operating temperature of the engine, an air temperature sensor 12 secured to the main air passage, and an oxygen sensor 13 located in the exhaust manifold 14. As will be described, the rotary detector unit 7 provides pulse signals indicative of engine speed, fuel injection timing and cylinder identification. The oxygen sensor 13 generates a signal indicative of the oxygen concentration in the exhaust gases, which concentration varies as a function of the air-fuel ratio of the mixture supplied to the cylinder 1. This oxygen concentration signal is about 1 volt when the air-fuel ratio is richer than the stoichiometric point and reduces to 0.1 volt when the ratio is leaner than the stoichiometric point.

The control circuit 8 comprises a microcomputer to provide ignition timing pulses to the ignitor 5 and fuel injection pulses to the injection valves 4 in response to the input signals received from the various sensors noted above.

Figure 5:
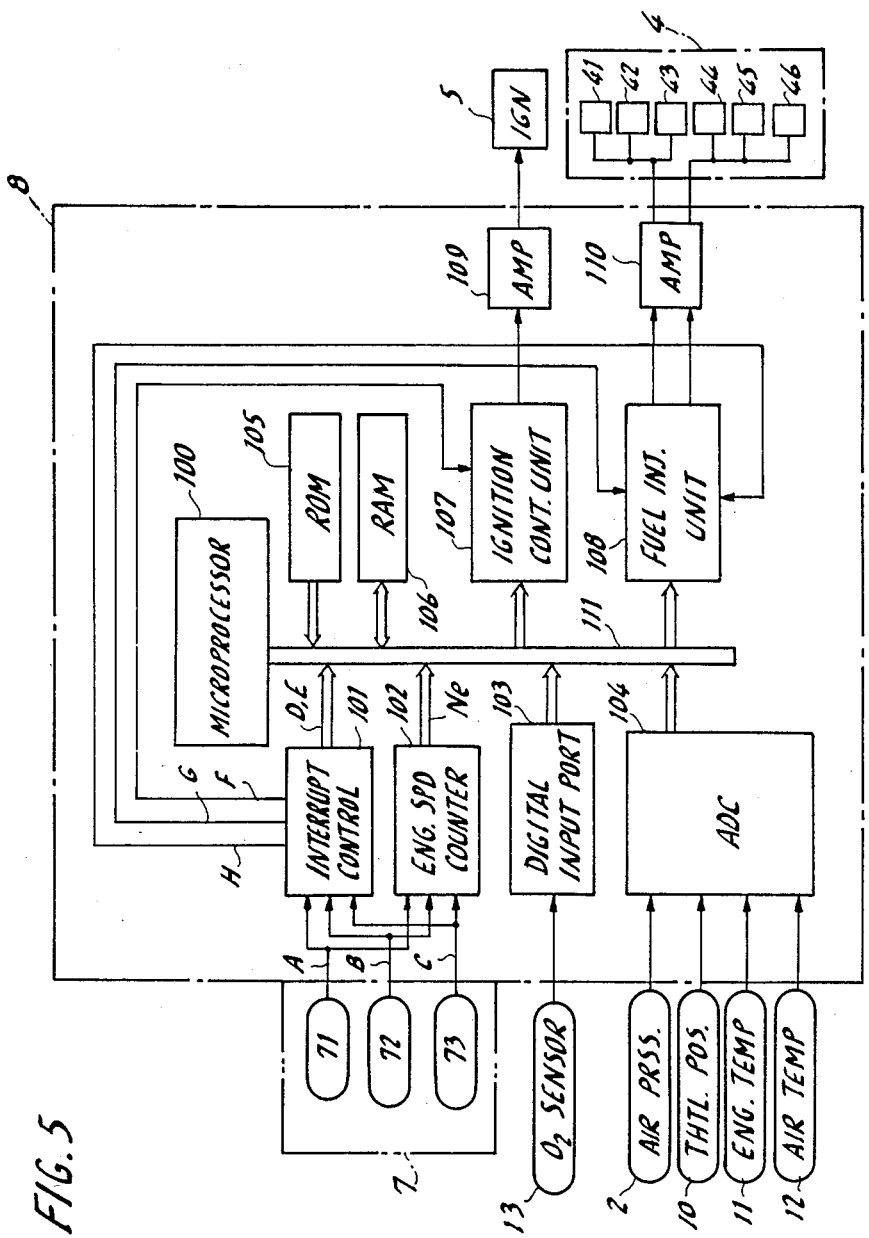
FIG. 5 is an illustration of details of the control unit of FIG. 4 and the associated input and output devices.
Figure 6:
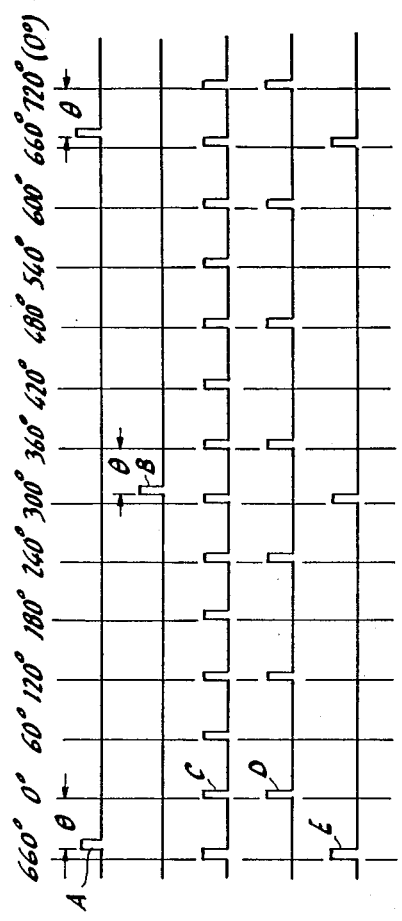
FIG. 6 is a timing diagram associated with the interrupt unit of FIG. 5.

As shown in FIG. 5, the microcomputer comprises a microprocessor 100 for performing executions of programmed instruction data, supplied from a read only memory 105, and by using temporary data stored in a nonvolatile random access memory 106. The read only memory 105 and random access memory 105 are connected to the microprocessor by a common bus 111. The data stored in the ROM 105 include basic fuel injection data each represening the open time of the fuel injection valves stored in a cell location addressable as a function of engine speed and intake pressure. The data stored in the memory 106 are retained during power-off periods so that they can be used in a later engine operation. Other data supplied to the microprocessor 100 include interrupt command pulses from an interrupt control unit 101, engine speed data from engine speed counter 102 which is responsive to the rotary detector unit 7, an oxygen concentration binary signal through a digital input port 103 from the oxygen sensor 13 and the analog output signals via an analog-digital converter 104 from the intake air pressure sensor 2, throttle position sensor 10, coolant temperature sensor 11 and intake air temperature sensor 12.

The microprocessor 100 operates on the received data and delivers output data to an ignition counter unit 107 and a fuel injection counter unit 108. The ignition unit 107 includes a register arranged to be loaded with ignition timing data from the microprocessor and a programmable counter which is preset by the data in the register to initiate counting clock pulses in response to a timing signal F from the interrupt control unit 101 to convert the ignition data into an ignition trigger pulse which is applied to the ignitor 5 through a power amplifier 109. The fuel injection unit 108 also includes a register to be loaded with fuel injection data from the microprocessor and a programmable counter preset by the data in that register to initiate counting clock pulses in response to timing pulses G and H supplied from the interrupt unit 101 to determine the duty ratio of the fuel injection pulses to be applied to injection valves 41–43 and 44–46 through a power amplifier 110.

The rotary detector unit 7 includes first, second and third rotary sensors 71, 72, 73. The first sensor 71 generates pulses A one for each revolution of the distributor shaft (which revolution corresponds to two crankshaft revolutions or 720 degrees) at an angle $\theta$ anterior to a 0-degree point, as shown at A in FIG. 6. The second sensor 72 provides pulses B one for every two crankshaft revolutions at an angle $\theta$ anterior to a 360-degree point. The third rotary sensor 73 produces six pulses C at 60-degree intervals for each crankshaft revolution.

The interrupt unit 101 receives the pulses A, B and C from the detector unit 7 and generates a series of ignition interrupt command pulses D which occur at one-half the repetition frequency of the pulses C immediately following the occurrence of each of the pulses A. The interrupt unit is further responsive to each of the pulses A and B to initiate counting the pulses C to generate a series of injection interrupt command pulses E which occur at one-sixth the repetition frequency of the pulses C so that this series of pulses occur at 360-degree crankangle intervals with the 300-degree point as a starting point. The interrupt command pulses D and E are applied to the microprocessor 100 to effect interrupt subroutines to be described.

The engine speed counter 102 initiates counting the pulses C in response to the occurrence of each of the pulses A and B to generate a binary signal Ne representing the engine speed.

The operation of the microcomputer will now be described with reference to FIGS. 7, 8A and 8B.

Figure 7:
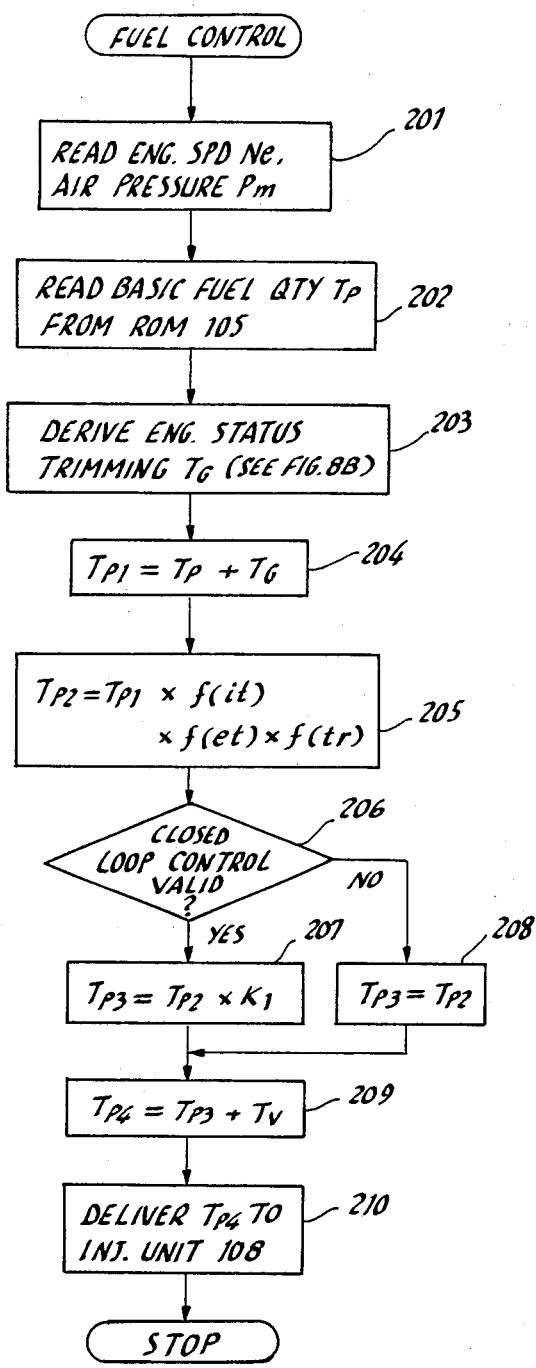
FIG. 7 is a flowchart of a fuel injection control routine.
Figure 8A:
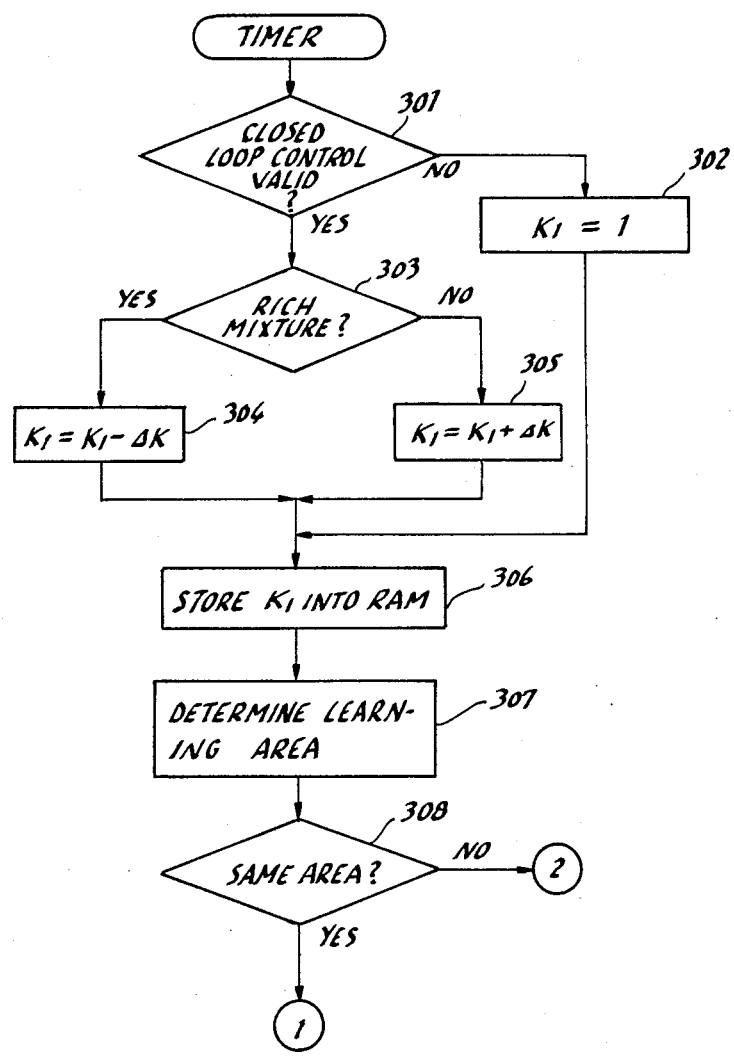
FIGS. 8A and 8B are flowcharts of a timer routine which is performed at regular inervals to derive first, mixture trimming value $K_1$ and a second, injection trimming value $T_G$.
Figure 8B:
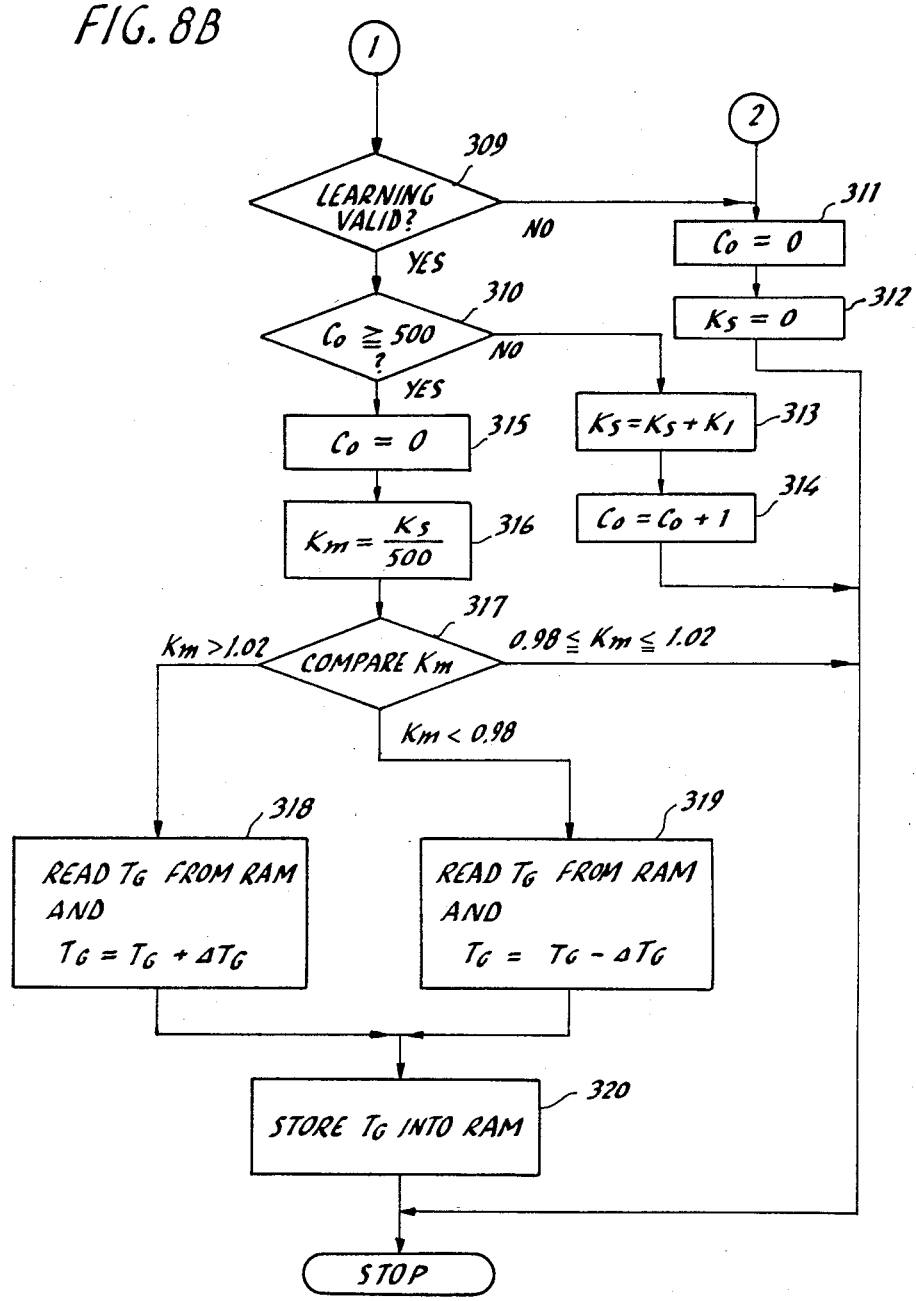

With the engine being started and the interrupt unit 101 issuing an injection interrupt command pulse E, the microprocessor 100 interrupts the execution of its main routine and control goes to the starting point of the flowchart of FIG. 7. In step 201, the microprocessor 100 reads the engine speed data Ne off the counter 102 and the intake pressure datum Pm from the AD converter 104. Control goes to Step 202 to derive an address code from the engine speed datum Ne and intake pressure datum Pm and reads a corresponding basic fuel injection datum $T_P$ from the read only memory 105.

At Step 203, the microprocessor 100 derives an engine status trimming value $T_G$ from the engine speed datum Ne in a timer routine which will be described later with reference to FIGS. 8A and 8B.

The basic fuel injection datum $T_P$ and the engine status trimming value $T_G$ are summed in a Step 204 to derive a sum $T_{P1} = T_P + T_G$.

At Step 205, intake air temperature and engine temperature data are read from analog-digital converter 104 and an intake air temperature trimming value f(it) and an engine temperature trimming value f(et) are retrieved from ROM 105 as a function of these temperature data. Also derived is a trimming value f(tr) which represents an engine transient condition. The trimming values f(it), f(et) and f(tr) are multiplied by $T_{P1}$ to derive a fuel injection datum $T_{P2}$.

The ROM 105 further stores closed loop mixture control requirement data in locations addressible as a function of engine operating parameters to allow the microprocessor 100 to determine whether closed loop mixture control is appropriate.

Control advances to Step 206 to effect this determination, by checking the engine operating conditions against the requirement data. In a typical example, the microprocessor checks to see if the engine coolant temperature is higher than a predetermined limit after the engine has been warmed up. If closed loop mixture control is judged as appropriate, control goes to Step 207 to multiply $T_{P2}$ by a mixture ratio trimming value $K_1$ which is read from the RAM 106, in a manner as will be described with reference to FIGS. 8A and 8b, thereby deriving a fuel injection datum $T_{P3}$. If the engine operating conditions fail to pass this test step 20b, the control goes to a Step 208 to set $T_{P2}$ equal to $T_{P3}$.

At Step 209, a battery trimming value $T_V$ is added to injection datum $T_{P3}$ to derive a final value of injection datum $T_{P4}$, the latter being delivered to the fuel injection unit 108 (Step 210). The fuel injection datum $T_{P4}$ sets the programmable counter of the fuel injection unit 108 and causes it to initiate counting clock pulses in response to an enable pulse G or H supplied from the interrupt unit 101 in synchronism with a subsequent pulse C from sensor 73. The output of the programmable counter is a pulse signal having a duty cycle determined by the fuel injection datum $T_{P4}$, which pulse opens the injection valves 41–46.

Description of the timer routine in which the engine status trimming value $T_G$ used in the Step 203 and the mixture control trimming value $K_1$ used in the Step 207 will now be given with reference to FIGS. 8A and 8B. This routine is repeated at regular intervals (100 milliseconds, for example).

First, a Step 301 is executed to check if the engine conditions justify the operating requirements of the closed-loop mixture control, and if not, control goes to a Step 302 to set $K_1$ equal to 1 and proceeds to a Step 306. If the closed-loop operating requirements are met, a Step 303 is executed to determine whether the air-fuel ratio as represented by the output of oxygen sensor 13 indicates a "rich" or "lean" mixture condition. If the mixture is richer than the stoichiometric point, control advances to a Step 304 to subtract a predetermined value $\Delta K$ from the previously obtained feedback trimming value $K_1$, and if the mixture is leaner than the stoichiometric point, the predetermined value $\Delta K$ is added to the previously obtained trimming value $K_1$ at Step 305.

In Step 306 the $K_1$ value thus derived in either of the Steps 302, 304 and 305 is stored into the RAM 106.

The Step 306 is followed by a subroutine in which the engine status trimming value $T_G$ is derived.

In the read only memory 105 is stored a table map comprising a list of different engine speed values Ne divided into different learning areas 1, 2, 3 and 4, as seen in the Table given below, and a list of engine status trimming values $T_{G1}$, $T_{G2}$, $T_{G3}$ and $T_{G4}$, corresponding to the areas 1, 2, 3 and 4, respectively.

TABLE

| Engine Speed (Ne) Area No. | $Ne \leq N_1$ 1 | $N_1 < Ne \leq N_2$ 2 | $N_2 < Ne \leq N_3$ 3 | $N_3 < Ne \leq N_4$ & $Ne > N_4$ 4 |
|---|---|---|---|---|
| Eng. Status Trim. Value | $T_{G1}$ | $T_{G2}$ | $T_{G3}$ | $T_{G4}$ |

In Step 307, the microprocessor reads an area datum from the ROM 105 to determine to which area the engine speed Ne belongs and proceeds to Step 308 to check the previously obtained learning area number against the most recently obtained learning area number to detect a match therebetween. If they do not match, control goes to Step 311 to set a timer count value Co to zero and proceeds to Step 312 to set an accumulated value Ks representing a total of previously obtained $K_1$ values to zero, and returns to the main routine. If the compared learning area number match, control goes to Step 309 to check if the engine operating conditions (such as coolant temperature, engine speed, intake pressure, throttle opening) fall within limits that ensure a valid learning process, and if not, control goes through Steps 311 and 312 to the main routine, and if so, it goes to Step 310 to check if the time count value Co is equal to or greater than 500. The timer count value is incremented by one at Step 314 each time the accumulated value Ks is summed with a new value $K_1$ at Step 313, so that control goes from Step 310 to Step 315 if the $K_1$ values have been updated 500 times or more and if not, it goes to Step 31 to add $K_1$ to Ks.

After resetting the timer count value Co to zero in Step 315, the microprocessor shifts the control to Step 316 to derive an average value Km of the past 500 closed-loop trimming values $K_1$ by dividing the Ks value obtained at Step 313 by 500.

Subsequently at Step 317, the average value Km is checked against limit values 0.98 and 1.02 to determine whether the Km value is higher than 1.02, or lower than 0.98, or lies therebetween. If Km is between these values, control returns to the fuel injection control routine, and if Km > 1.02, control advances to Step 318 to read an engine status trimming value $T_G$ from the RAM 106 as a function of the learning area number obtained in the Step 307 and to add a predetermined trimming value $\Delta T_G$ to the retrieved trimming value $T_G$, and further advances to Step 320 to store the $T_G$ value now obtained at Step 318 into a cell location of the RAM 106 addressable as a function of the learning area number. If the average value Km is smaller than 0.98, Step 319 is followed to read a trimming value $T_G$ and subtract the predetermined trimming value $\Delta T_G$ from $T_G$, and control goes to Step 320 to store the $T_G$ value into the RAM. Therefore, engine status trimming values are stored in cell locations of the RAM 106 addressable as a function of corresponding learning area numbers and updated through a learning process to reflect constantly changing engine operating conditions.

Therefore, in the Step 203 of the fuel injection control routine, an appropriate one of the engine status trimming values $T_G$ is obtained as a function of the engine speed datum Ne.

What is claimed is:

1. A mixture control system for an internal combustion engine, comprising:
    first means for detecting the pressure of air inducted to said engine;
    second means for detecting the speed of said engine;
    third means for detecting the concentration of a predetermined composition of exhaust emissions from said engine, said concentration varying as a function of the air-fuel ratio of a mixture supplied to said engine;
    a memory having a plurality of storage locations;
    control means effective to determine the optimum value of the air-fuel ratio of a mixture to be inducted to said engine, said control means including means for:
    (a) deriving a basic quantity of fuel to be injected to said engine as a function of the detected pressure and engine speed,
    (b) deriving a first trimming value as a function of the detected concentration,
    (c) determining a second trimming value as a function of one of a plurality of ranges of different engine speed values to which the detected engine speed belongs,
    (d) correcting said second trimming value dependant on said first trimming value,
    (e) storing the corrected second trimming value into a storage location of said memory exclusively addressable as a function of the detected engine speed,
    (f) reading the stored second trimming value as a function of the detected engine speed from said memory, and
    (g) trimming said basic quantity by adding thereto the read second trimming value; and
    means for injecting fuel to said engine in response to the trimmed quantity.

2. A system as claimed in claim 1, wherein said memory is of a nonvolatile type.

3. A system as claimed in claim 1, wherein said storage locations of said memory are addressable as a function of an engine speed value, said memory storing second trimming values one of which corresponds to one of a plurality of ranges of different engine speed values, and wherein said control means is arranged to successively detect to which one of said ranges the detected engine speed belongs in order to successively determine one of the stored second trimming values corresponding to the detected engine speed value, said stored second trimming values being corrected in dependance on said first trimming value, said first trimming value being corrected in accordance with the output state of said third means.

4. A system as claimed in claim 3, wherein control means is arranged to accumulate said first trimming value, derive an average value of the accumulated first trimming values and trim said stored second trimming value by a predetermined amount in a direction depending on said average value.

5. A mixture control system for an internal combustion engine, comprising:
    first means for detecting the pressure of air inducted to said engine;
    second means for detecting the speed of said engine;

third means for detecting the concentration of a predetermined constituent of exhaust gases from said engine, said concentration varying as a function of the air-fuel ratio of a mixture supplied to said engine;

a memory having a plurality of storage locations;

data processing means programmed to perform the step of:

(a) deriving a basic quantity of fuel to be injected to said engine as a function of the detected pressure and engine speed;

(b) deriving a first trimming value as a function of the detected concentration;

(c) repeating the step (b) a number of predetermined times to derive an average value of the derived first trimming values;

(d) determining a second trimming value as a function of one of a plurality of ranges of different engine speed values to which the detected engine speed belongs;

(e) correcting said second trimming value according to said average value;

storing the corrected second trimming value into a storage location of said memory exclusively addressable as a function of the detected engine speed;

(g) reading the stored second trimming value as a function of the detected engine speed from said memory;

(h) trimming said basic quantity by adding thereto the read second trimming value; and (i) further trimming the trimmed basic quantity by multiplying said average value of derived first trimming values thereby; and means for injecting fuel to said engine in response to the basic quantity trimmed in the step (i).

6. A system as claimed in claim 5, wherein said memory is of a nonvolatile type.

7. A system as claimed in claim 5, wherein said storage locations of said memory are addressable as a function of an engine speed value, said memory storing second trimming values one of which corresponds to one of a plurality of ranges of different engine speed values, and wherein said data processing means is further programmed to perform the steps of:

(A) successively detecting to which one of said ranges the detected engine speed belongs;

(B) detecting a match between the successively detected ranges; and (C) correcting the stored second trimming value in dependance on said first trimming value in response to said match being detected.

8. A system as claimed in claim 7, wherein data processing means is further programmed to perform the steps of:

accumulating said first trimming value;

deriving an average value of the accumulated first trimming values; and wherein in the step (C) the stored second trimming value is trimmed by a predetermined amount in a direction depending on said average value of the first trimming values.

* * * * *